US008700640B2

United States Patent
Shivashankar et al.

(10) Patent No.: US 8,700,640 B2
(45) Date of Patent: Apr. 15, 2014

(54) SYSTEM OR APPARATUS FOR FINDING INFLUENTIAL USERS

(75) Inventors: Subramanian Shivashankar, Chennai (IN); Jawad Mohamed Zahoor, Chennai (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/542,795

(22) Filed: Jul. 6, 2012

(65) Prior Publication Data

US 2013/0138663 A1 May 30, 2013

(30) Foreign Application Priority Data

Nov. 30, 2011 (IN) .............................. 3450/DEL/2011

(51) Int. Cl.
*G06F 17/30* (2006.01)

(52) U.S. Cl.
CPC .... *G06F 17/30011* (2013.01); *G06F 17/30283* (2013.01); *G06F 17/30286* (2013.01)
USPC ........... 707/748; 707/722; 707/723; 707/749; 707/759; 707/751; 707/769; 707/770; 709/201; 709/203; 709/213; 709/217; 705/14.69; 715/753

(58) Field of Classification Search
CPC .................... G06F 17/30011; G06F 17/30283; G06F 17/30286
USPC ................ 707/722, 723, 748–751, 769–770; 709/201, 203, 213, 217; 705/14.69; 715/753
See application file for complete search history.

(56) References Cited

U.S. PATENT DOCUMENTS

| | | | | |
|---|---|---|---|---|
| 7,069,259 | B2 * | 6/2006 | Horvitz et al. .................. | 706/25 |
| 7,130,836 | B2 * | 10/2006 | Grosser et al. .................. | 706/47 |
| 7,970,762 | B2 * | 6/2011 | Goronzy et al. ............. | 707/732 |
| 8,180,770 | B2 * | 5/2012 | Ranasinghe et al. .......... | 707/732 |
| 8,312,056 | B1 * | 11/2012 | Peng et al. ..................... | 707/802 |
| 8,560,471 | B2 * | 10/2013 | Shama et al. .................. | 706/13 |
| 2009/0055435 | A1 * | 2/2009 | Kiviluoto et al. .......... | 707/104.1 |
| 2009/0217178 | A1 * | 8/2009 | Niyogi et al. ................ | 715/753 |
| 2011/0314007 | A1 * | 12/2011 | Dassa et al. .................. | 707/723 |
| 2011/0320284 | A1 * | 12/2011 | Tennenholtz et al. ....... | 705/14.69 |
| 2012/0209832 | A1 * | 8/2012 | Neystadt et al. .............. | 707/723 |

* cited by examiner

*Primary Examiner* — Frantz Coby
(74) *Attorney, Agent, or Firm* — Coats and Bennett PLLC

(57) ABSTRACT

Embodiments of the invention disclose a method, identifier and a computer program product for identifying influential users among a group of users associated with a communication network. The disclosed method includes selecting two or more ranking models from a plurality of ranking models such that each ranking model provides scores to the users in the group based on a usage data of the users, calculating a weighing factor for each of the selected ranking models, generating an aggregate score for each user using the weighing factor and the score provided by each one of the selected model such that based on the aggregate score, the influential users among the group of users are identified.

16 Claims, 4 Drawing Sheets

SYSTEM OR APPARATUS FOR FINDING INFLUENTIAL USERS

RELATED APPLICATIONS

This application claims the benefit of priority under 35 U.S.C. §119(a) to an Indian Patent Provisional Application filed in the Indian Intellectual Priority Office on Nov. 30, 2011 and assigned serial number 3450/DEL/2011, the entire contents of which are incorporated herein by reference.

TECHNICAL FIELD

Implementations described herein relate to a method, an identifier and a computer program product for identifying influential users among a plurality of users associated with a communication network.

BACKGROUND

With the increase in communication networks, the need for correctly identifying the influential members/users is also increasing. Finding influential users in various communication networks including social networks, telecommunication networks, social media, office networks, academia networks, community networks etc., is an important task. Particularly, the identified list of influential users in a telecommunication network may be used in targeting advertisement/service campaigns for the relevant network service provider and could potentially have a viral effect in providing value added services to the network service provider. Each operator might have a different definition of who the influential users are, for instance, the influential person may be a person who has been with the network for long time, or an influential user may be someone who uses all the advanced services of the operator or someone who is well connected to many others in the network etc.

Typically, a single network measure such as authority, centrality or prestige measure is used to capture the influence of a user. Some of the network measures that are used to capture the influence of a user are eigenvector centrality, degree centrality, closeness centrality, etc. However, the single network measures may not be predictive in nature, i.e., the single network measures may not precisely identify whether a user is influential or not or how much influential the user is, say, very high, high, medium, low or very low. Also, a single network measure may not be good enough to capture the influence of a user in a given network accurately.

For example, in a telecommunication domain, degree centrality captures number of calls/sms a user makes, which can even be to a set of people who call among themselves, say a calling group, while betweenness centrality is based on how many users are non-trivially connected to the concerned user/node, i.e., connectivity must be such that the information diffusion throughout the network is facilitated. Other factors in a telecom domain may be call usage count, number of refills made, amount of money spent on calls/SMS (Short Message Service)/Data traffic, etc.

The definition of information diffusion/influence of a user in a network depends on the context of the network. For example, influence in a twitter dataset is based on re-tweets, number of followers, etc. In citation graphs, the information diffusion would be based on citations, number of downloads and other extrinsic measures that can be captured. The definitions of 'influential users' hence vary with each end-user or requirement as well. For example, with a telecommunication operator, influential users would vary with the objective of a particular ad campaign or promotion activity for which the influential users are identified.

Another method to identify influential users is to use a predictive model by combining different centrality/social network influence measures which is known as supervised learning based method. The supervised learning based method has labeled data to learn the weights of each method in advance, and uses the labeled data for combining scores/rank aggregation on test data. Although the supervised learning based method is an effective method, however getting sufficient labeled data (supervision) for domains which consist of large-scale data is practically infeasible. Further, there are domains that have "cold-start" trouble naturally, for example in telecommunication domain, there is no single definition of which these influential users are, and there is no labeled data to learn the weights. Thus, to build a supervised learning based prediction model is not possible, which can take various user measures (both network and attribute based) as input and give 'influential or not' as output. Further, the unsupervised methods that either uses a single measure or that uses the combination by maximizing consensus between models might lead to a spurious result.

Hence, there is a well-felt need for an effective method and system for identifying influential users in a communication network.

SUMMARY

With a view to overcome or at help to alleviate one or more of the above drawbacks, a method, an identifier and a computer program product for identifying influential users in a communication network is disclosed.

According to an embodiment of the invention, a method for identifying influential users among a group of users associated with a communication network is disclosed. The method comprises selecting two or more ranking models from a plurality of ranking models such that each ranking model provides scores to the users in the group based on a usage data of the users, calculating a weighing factor for each of the selected ranking models, generating an aggregate score for each users using the weighing factor and the score provided by each one of the selected model. The influential users among the group of users are identified based on the aggregate score. According to an embodiment the identification of the influential users among the group of users includes comparing the aggregate score with a predefined score.

According to an embodiment, the method further comprising labeling a number of users among the group of users using an active learning process thereby dividing the group of users into labeled users and unlabeled users. According to another embodiment the active learning process uses an uncertainty density sampling technique for selecting the number of users from the group of users. According to yet another embodiment the method further comprising providing a feedback to the active learning process for improving the selection of labeled users.

According to yet another embodiment the weighing factor (C) may be calculated using following equation:

$$C = \frac{1}{2m}\left(\alpha * \sum_{j \in Labeled} \|f_j(x) - y\|^2 + \beta * \sum_{j \in L \cup U} \sum_{i \in R} \|f_{ij}(x) - \mu_j\|^2 \right)$$

wherein 'm' represents total number of users, 'R' represents ranking models, L denotes labeled users, U denotes unlabeled users, α represents relative weightage for data of labeled users, β represents relative weightage for consensus between ranking models on the combined data of labeled as well as unlabeled users and wherein for a user 'j' among the 'm' users, '$\mu_j$' may be a mean of the scores provided by each selected model to the 'j$^{th}$' user. In case where both are given equal weightage, these terms may be ignored.

According to yet another embodiment selecting two or more ranking models comprises, providing scores to the users in the group using each one of the ranking models, computing correlation between the scores provided to the users by the ranking models, and selecting two or more ranking models, based on the correlation, such that the ranking models, which provide substantially different scores to the users, are selected. This is done to avoid using repetitive ranking models so that it does not lead to ill-effects when enforcing consensus between ranking models.

According to yet another embodiment the aggregate score may be generated by multiplying the weighing factor of each model with the score provided by said model to a particular user so as to obtain a modified score and adding the modified scores obtained from two or more selected ranking models to obtain the aggregate score for each user.

According to yet another embodiment, calculating the weighing factor includes using a stochastic gradient descent technique.

According to yet another embodiment, calculating the weighing factor includes using a Parallel Stochastic Gradient descent technique.

According to another embodiment an influential users identifier for identifying influential users among a group of users associated with a communication network is disclosed. The disclosed identifiers may be implemented in a computer system or a group of computer system. The identifier comprises a ranking model selection module configured for selecting two or more ranking models and providing scores to the users in the group using said ranking models based on usage data of the users, a calculation module configured for calculating a weighing factor for each of the selected ranking models and an aggregate score generation module configured for generating an aggregate score for each users using the weighing factor and the score provided by each one of the selected model such that the influential users may be identified based on the aggregate score.

According to an embodiment the ranking model selection module further comprises a module for providing scores to the users in the group using each one of the ranking models, a correlation computing module configured for computing correlation between the scores provided to the users by the ranking models, and a selection module configured for selecting two or more ranking models, based on the correlation, such that the ranking models, which provide substantially different scores to the users, are selected.

According to yet another embodiment the aggregate score generation module may be further configured to multiply the weighing factor of each model with the score provided by said model, to a particular user so as to obtain a modified score, and add the modified scores obtained from two or more selected ranking models to obtain the aggregate score for each user. The aggregate score generation module may further compare the aggregate score with a predefined score to identify the influential users among the group of users.

According to another embodiment the identifier further comprising a user selection module configured for labeling a number of users among the group of users using an active learning process thereby dividing the group of users into labeled users and unlabeled users. According to yet another embodiment the identifier may further have a feedback module configured for providing a feedback to the active learning process for improving the selection of labeled users.

According to yet another embodiment the calculation module may be configured to calculate the weighing factor (C) using following equation:

$$C = \frac{1}{2m}\left(\alpha * \sum_{j \in Labeled} \|f_j(x) - y\|^2 + \beta * \sum_{j \in L \cup U} \sum_{i \in R} \|f_{ij}(x) - \mu_j\|^2\right)$$

wherein 'm' represents total number of users, 'R' represents ranking models, L denotes labeled users, U denotes unlabeled users, α represents relative weightage for data of labeled users, β represents relative weightage for consensus between ranking models on the combined data of labeled as well as unlabeled users and wherein for a user 'j' among the 'm' users, '$\mu_j$' may be a mean of the scores provided by each selected model to the 'j$^{th}$' user. In case where both are given equal weightage, these terms may be ignored.

According to another embodiment the computer program product storing program instructions executable by a computer system for identifying influential users among a group of users associated with a communication network is disclosed. The program instructions comprises code means which when run on the computer system, causes the computer system to select two or more ranking models and providing scores to the users in the group using said ranking models based on usage data of the users. The code means then causes the computer system to calculate a weighing factor for each of the selected ranking models and generate an aggregate score for each users using the weighing factor and the score provided by each one of the selected model. The code means causes the computer system to identify the influential users based on the aggregate score among the group of users.

BRIEF DESCRIPTION OF DRAWINGS

To further clarify the above and other advantages and features of the disclosure, a more particular description will be rendered by references to specific embodiments thereof, which are illustrated in the appended drawings. It is appreciated that the given drawings depict only some embodiments of the method, system, computer program and computer program product and are therefore not to be considered limiting of its scope. The embodiments will be described and explained with additional specificity and detail with the accompanying drawings in which.

DETAILED DESCRIPTION

Disclosed herein are embodiments of a method an identifier and a computer program product for identifying influential users among a group of users associated with a communication network. The disclosed method, identifier and computer program product minimizes manual intervention and enable continuous learning though constant feedback mechanism to identify influential users in a communication network.

Figure 1:
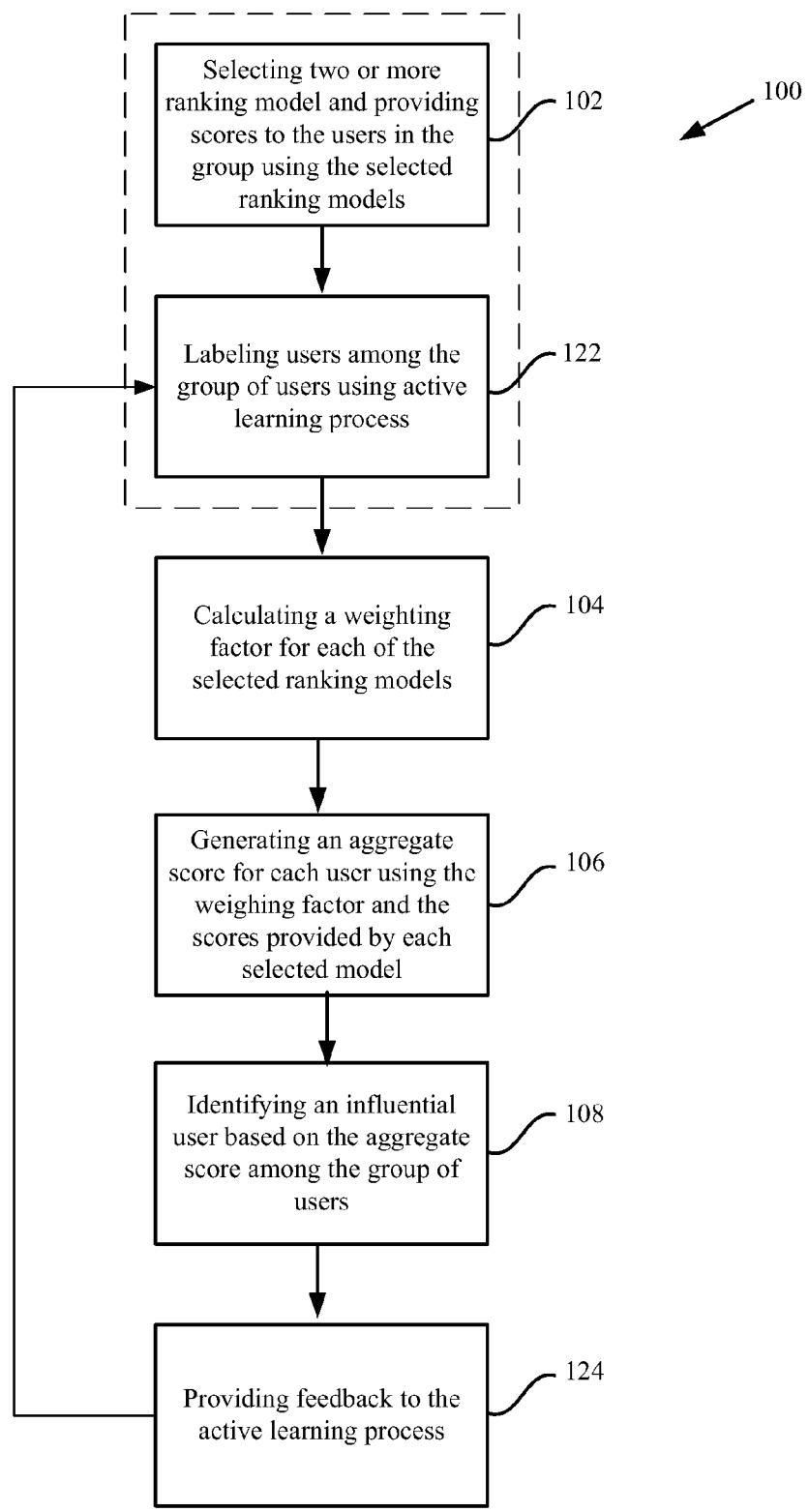
FIG. 1 illustrates a flowchart showing a method of identifying influential users among a group of users associated with a communication network in accordance with an embodiment of the invention.

Referring to FIG. 1, a flowchart showing a method 100 for identifying one or more influential users among a group of users associated with a communication network is illustrated. The communication network may be a telecommunication network or a wired network, but may also be a network service that utilizes Internet Protocol based networks. Such network services includes social networks (e.g. Facebook, Google+), social media, office networks, academia networks, community networks or any other network service having plurality of users that may be using one or more network based services provided by the network service provider. Typically, such networks have a large number of users and practically, identification of one or more influential users among the plurality of users may be very difficult and a tedious task. According to an embodiment of the invention, the group of users may consist of all the users in the communication network. According to another embodiment of the invention, the group of users may consist of all the users in the communication network for which a usage data of one or more services may be available with the network service provider.

According to an aspect of the invention, one or more network service provider associated with the communication network may have the usage data of the group of users indicating the usage of one or more services in the communication network. The usage data may include the use of one or more services, by the user such as tariff plan details, billing details, offers availed, calling details, etc.

According to an embodiment of the invention, the usage data may be extracted from a Changing Data Record (CDR) list available with the network service provider. The CDR list may be a detailed record of all telecommunication services availed by all the users in the group including call rates, tariff plan, internet usage, bill details, preferences of services, service requests, etc.

At step 102, two or more ranking models may be selected from a plurality of ranking models. The selected ranking models provide score or rank to the users of the group based on the usage data, such that the users may be distinguished in accordance with their usage data. According to an exemplary embodiment of the invention, the ranking models may be based on such as, but not limited to, Eigen vector centrality, closeness centrality, degree centrality, betweenness centrality, and network service provider etc.

For identifying one or more influential users from the group of users, ranking models selection may be critical. According to an embodiment, the ranking models may be selected based on a past experience. According to another embodiment, the ranking models may be selected by a process illustrated in FIG. 2.

Figure 2:
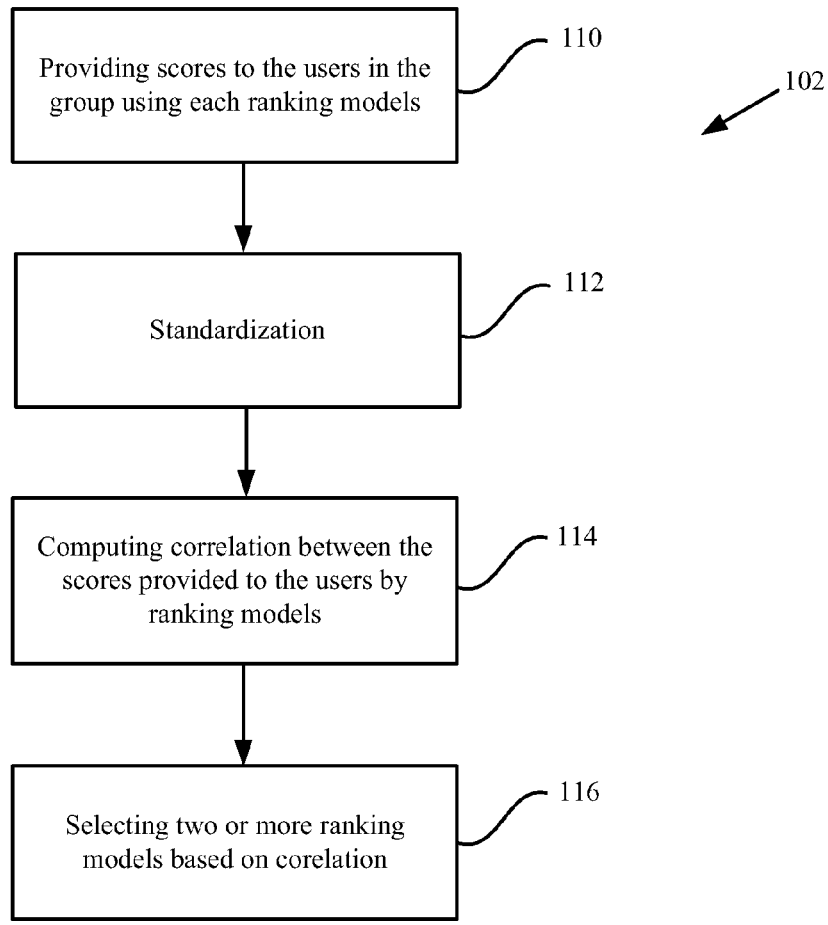
FIG. 2 illustrates a flowchart showing a method of selecting two or more ranking models in accordance with an embodiment of the invention.

Referring now to FIG. 2 a process of selecting two or more ranking models from a plurality of ranking models is illustrated. At step 110, scores may be provided to the users in the group using each ranking models based on a usage data of the users. Accordingly, at least two scores are provided to each user in the group. According to another embodiment of the invention, the scores provided to the users in the group may be in the form of numeric scores or grades or percentages, etc.

For example, in the case of a telecommunication network, each user may be provided with scores based on their position in the Charging Data Record (CDR) list using different ranking models. According to yet another example, the scores may be based on attributes of the CDR information, which may exemplarily be quantity of time, the money spent by the user on voice calls; data usage via e.g. GPRS (General Packet Radio Service), EDGE (Enhanced Data rates for GSM Evolution), HSPA (High Speed Packet Access), HSPA+, LTE (Long Term Evolution); message services like SMS and MMS (Multimedia Messaging Service), and other services opted from the network services provider.

Further, according to an optional embodiment, at step 112, the scores of the users in the group provided by the various ranking models may be standardized in a specific format such that all the scores of the users in the group represents a common unit of measure.

For example, each ranking model may provide a score to each user in the group, the score may be in the form of numeric scores or grades or percentages. If the scores are in different format, then it may not be possible to use the output of the various ranking models to identify influential users in the group. The scores may be standardized to produce a common output such that the scores provided by various ranking models to the users in the group may have a similar unit of measure such as, but not limited to, all the scores of the users in the group may be standardized in numeric score or grades.

According to an embodiment of the invention, standardization may not be required, if the output of the various ranking models is in same unit of measure, such as but not limited to, numeric score, grades or ranks.

According to an exemplary embodiment, the standardization of the scores may be performed by a standardization method. For example, the scores may be represented from a ranking model as X, where individual scores of the users in the group of users are denoted as X1, X2 ... Xn. According to an embodiment of the invention, for standardization, mean and standard deviation of the scores may be computed and the computed mean and standard deviation may be denoted as M and SD respectively. The standardization may be performed using the following equation:

$$\text{Standardize}(X1) = X1 - M/SD$$

According to an alternate embodiment of the invention, the standardization of the scores may be performed by a normalization method. The normalization may be performed to standardize the scores, wherein the scores of the users in the group may be normalized. According to yet another embodiment the normalization may be performed by the minmax normalization. For example, the scores may be represented from a ranking model as X, wherein individual scores of the users in the group of users are denoted as X1, X2 ... Xn. A minimum value among the scores may be denoted as min(X), and maximum may be denoted as max(X). According to an embodiment, the normalization may be performed using the following equation:

$$\text{Minmax}(X1) = [X1 - \min(X)] / [\max(X) - \min(X)].$$

Further, at step 114, the scores or the standardized, as the case may be, of the users in the group may be correlated. At step 116 two or more ranking models may be selected based on the correlation among the plurality of ranking models such that the selected ranking models have diverse characteristic.

For example, the scores based on amount of calls made/spent and out-degree centrality may be correlated and any one of the employed ranking models may be chosen. According to an embodiment of the invention, while choosing two or more ranking model from multiple ranking models, it may be ensured that the ones chosen are computationally less intensive. For example, the betweenness centrality based ranking model and ego-betweenness centrality based ranking model may be correlated. But, since the ego-betweenness centrality based ranking model may be usually much faster than betweenness centrality based ranking model, the diverse computationally efficient ranking models may be chosen.

According to another embodiment of the invention, the ranking models with substantially different scores provided to the users in the group are selected and the ranking models with similar scores are eliminated or ignored.

According to an embodiment, the selected ranking models may be used as a standard or benchmark to provide scores to the new set of users associated with the similar type of data. For example, lets say that a telecommunication network has a total of 1000 users and a sample set of 100 users may be considered first, to select influential users among the sample set. Further, once the ranking models are selected for the sample set of 100 users using the above method, the same selected ranking models may be used for the remaining 900 users in the telecommunication network. For identifying influential users among the remaining 900 users, the selected ranking models may be considered to provide scores to the remaining 900 users.

Referring back to FIG. 1 the scores may be provided to the users in the group using selected ranking models based on the usage data of the users. According to an aspect of the invention, each selected ranking model may provide a score to each user in the group. Therefore, at least two scores are provided to each user in the group. At step 104, a weighing factor is calculated for each of the selected ranking models. According to an embodiment, before calculating weighing factor, the users are divided as labeled user and unlabeled users as illustrated at step 122.

For divided the users as labeled user and unlabeled users, a random number of users among the group of users are selected and labeled. According to another embodiment of the invention, an active learning (AL) process may be employed to select a random number of users among the group of users such that the users having a diverse set of scores are selected. The active learning process is a sub-field of a machine learning and, more generally, artificial intelligence. Typically, the active learning process attempt to overcome the labeling bottleneck by asking queries in the form of unlabeled instances to be labeled by an oracle such as, but not limited to, a human data operator. In this way, the active learner aims to achieve high accuracy using as few labeled instances as possible, thereby minimizing the cost of obtaining labeled data.

According to an embodiment, the active learning processes may employ such as, but not limited to, random, uncertainty, certainty, and uncertainty density etc. sampling techniques. The disclosed method may work better with the users that are diverse and most informative such that the users whose scores are very similar may not be useful and should not be selected.

For example, in a Customer Relation Management (CRM) system, the selection of users among the group of users may depend on the number of referrals made which may be used as an indicator i.e., if a user has made more than 5 successful referrals then the user is influential and may be selected by the active learning process. Other indicators may include friends switching to the same plan as this user, friends switching service provider, etc.

Further, the selected users in the group of users are labeled thereby dividing the group of users into a group of labeled users and unlabeled users. According to an embodiment of the invention, the labeled users correspond to the selected users.

According to an aspect of the invention, active learning process may be useful in situations where labeled user is scarce, unlabeled user is available and labeling has some cost associated with it. In such situations, active learning process helps by identifying a minimal set of users to label that will allow the training of an effective indicator of classifying influential users.

According to an embodiment of the invention, the labeling of user may be a manual or automated or a semi-automated process. According to another embodiment of the invention, the labeled users have a label or an indicator representing the influence of the user in the group.

According to another embodiment of the invention, the number of users to be labeled among the group of users may depend on the budget, i.e., number of human experts available for labeling (data operators), average time required for labeling, total time available for labeling, etc or/and the amount of information available for labeling the users with the help of a computer and without human intervention. According to another embodiment of the invention, the selection of users depends on the usage data of the user such that the usage data is informative and diverse.

According to a specific embodiment of the invention, the active learning process employs an uncertainty density sampling technique for selecting random number of users to be labeled in the group. The uncertainty density sampling technique select users one by one such that the users with very dissimilar to the ones picked before and that are similar to the ones that are unlabeled (not being selected for labeling). The sampling technique also includes the criteria to select the users for whom the selected ranking models disagree most on the score of the users. Thus, uncertainty density sampling technique selects users for whom disagreement between the selected ranking models is maximum (uncertainty), and those that are dissimilar to the labeled users and similar to the unlabeled users.

According to another embodiment of the invention, a semi-supervised learning based approach may be used, which uses labeled and unlabeled users or data points, since providing labels to all the users in the group of users to build a supervised model may be difficult. The unlabeled users or data points provide regularization by enforcing consensus between the selected ranking models.

According to an embodiment, the weighing factor (C) may be calculated using following equation:

$$C = \frac{1}{2m}\left(\alpha * \sum_{j \in Labeled} \|f_j(x) - y\|^2 + \beta * \sum_{j \in L \cup U} \sum_{i \in R} \|f_{ij}(x) - \mu_j\|^2\right)$$

wherein 'm' represents total number of users, 'R' represents ranking models, L denotes labeled users, U denotes unlabeled users α represents relative weightage for data of labeled users, β represents relative weightage for consensus between ranking models on the combined data of labeled as well as unlabeled users and wherein for a user 'j' among the 'm' users, '$\mu_j$' is a mean of the scores provided by each selected model to the '$j^{th}$' user. In case where both are given equal weightage, these terms may be ignored.

The semi-supervised learning based rank aggregation problem may be captured using the above mentioned formula for weighing factor (C) and stochastic gradient descent algorithm may be used to estimate the parameters of a rank aggregation model. Exemplarily considering 'm' users in the network, and 'R' ranking models, which may be a combination of both centrality measures and attribute based measures. For a user 'j' among the 'm' users, consensus between the models may be measured using '$\mu_j$', which denotes the average score. A subset of the 'm' users may have point-wise labels (L), which is influential or not. The unlabeled data points may be denoted as 'U'. 1/m disclosed in the above-defined formula is an averaging or normalization term. The first part of the formula captures the squared loss based on the labeled data, and the second part captures the disagreement-based loss on the complete data (labeled and unlabeled). Since, they are squared losses, ½ may be introduced for convenience sake (normal practice). Thus, ½m is the normalization term in the above equation.

Figure 3:
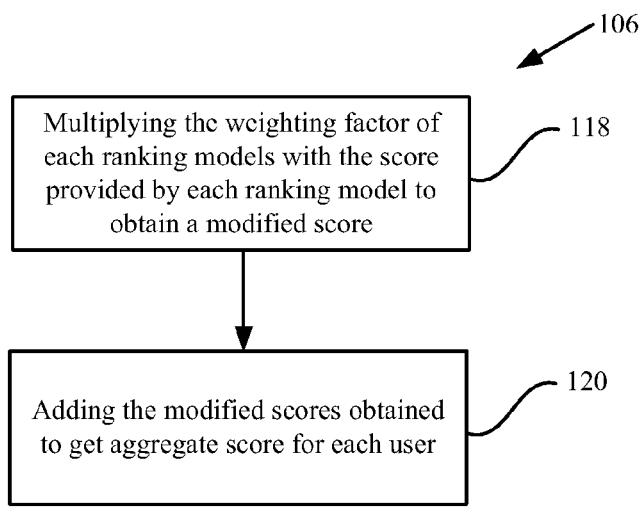
FIG. 3 illustrates a flowchart showing a method of obtaining an aggregate score for each user according an embodiment of the invention.

Referring back to FIG. 1, at step 106 an aggregate score may be generated for each user using the weighing factor and the score provided by each one of the selected model. According to an embodiment, FIG. 3 illustrates a method of generating aggregate score. At step 118, the weighing factor of a particular model may be multiplied with the score provided by that model to a particular user so as to obtain a modified score a specific user with a particular model. For a particular user, the process may be repeated for each model. At step 120, the modified scores for a specific user may be added to obtain the aggregate score for that specific user.

For example, presuming that three models 1, 2, 3 were selected at step 102 and for a specific user say 'P', the score provided by said selected model are A, B, C respectively. Further, presuming that the weighing factor obtained for said models 1, 2, 3 are X, Y, Z respectively. The aggregate score for the user 'P' will be X*A+Y*B+Z*C. The process of obtaining aggregate score may be repeated for all the users including labeled users and unlabeled users.

Again referring back FIG. 1, at step 108 the influential users are identified based on the aggregate score among the group of users. According to an embodiment, the influential users are identified, among the group of users, by comparing the aggregate score with a predefined score. According to an embodiment, the predetermined score may be '0' or '1'. If the aggregate score of a user is '1' then the user may be an influential user or if the aggregate score of the user is '0' then the user may not be an influential user.

According to an embodiment of the invention, the method illustrated with reference to FIG. 1, FIG. 2 and FIG. 3 illustrates an Active Semi-supervised Learning based Rank Aggregation (ASSLRA) method. The disclosed ASSLRA method is in between supervised and unsupervised learning techniques. The ASSLRA method utilizes the labeled data by tuning the weights to reduce misclassification error, and utilizes unlabeled data also by enforcing consensus between the different ranking models. The weightage to give for misclassification error and consensus part may be controlled by an input parameter, which may be set automatically.

According to an embodiment of the invention, the weighting factor may be a vector comprising numerical values that generally correspond to how reliable a given ranking model is (e.g., a weighting factor with larger values generally corresponds to a more reliable ranking model than a weighting factor with smaller values). According to specific embodiment of the invention, the weighting factors assigned to the labeled users and the unlabeled users may be the same.

According to another embodiment of the invention, the weighting factor may be optimised to yield the highest success rate on a labeled user or data points and the determined constant values for the weighting factor are used for labeling the unlabeled user or data points. The labeling of unlabeled data set may be critical for identifying influential users in the group.

According to an embodiment of the invention, the ASSLRA method uses a stochastic gradient descent technique to calculate the weighting factor based on the labeled and the unlabeled users and the ranking models.

The Stochastic Gradient descent procedure may be calculated using algorithm 1, where $f(x)=w^T x$, wherein labeling denotes the user or data point being labeled or not (0/1). $\alpha$ and $\beta$ denote the relative weights for prediction correctness on labeled points and consensus respectively, $\alpha+\beta=1$. This may be used in cases when the labeling process is not so reliable, and may set a relatively lower weight for alpha than beta. In other cases, the alpha and beta parameters may be ignored. Learning Rate may be the parameter, which tunes the rate of convergence.

In the weight update part $$w_i = w_{i-1} - \Delta,$$

$\Delta$ may be obtained by differentiating the above mentioned weighting factor with regard to subtraction or moving in the opposite direction to find the parameters which minimizes the weighting factor.

---

Algorithm 1 Stochastic Gradient Descent

---

Input: Scores, L
Output: w
   w ← 0 //Note that score vector has 1 appended
   for iter : 1 to Iterations do
      $w_i$ ← $w_{i-1}$ − Learning Rate * [labelind * a * (f(x) − y) + β * (f(x) − μ)]
   end for

---

According to another embodiment of the invention, a Parallel Stochastic Gradient descent technique may be implemented for Stochastic Gradient descent. The Parallel Stochastic Gradient descent technique is illustrated in Algorithm 2 below, for supervised setup.

---

Algorithm 2 Parallel Stochastic Gradient Descent

---

Input: Scores, L
Output: w
   Given m datapoints are partitioned into k parts and given to a node
   (datanode) in the (hadoop) cluster
   for c : 1 to k do
      $w_c$ ← 0 //Note that score vector has 1 appended
      for iter : 1 to Iterations do
         $w_{ci}$ ← $w_{ci-1}$ − LearningRate * [labelind * α * (f(x) − y) +
         β * (f(x) − μ)]
      end for
   end for
   $w \leftarrow \frac{1}{k}\sum_c w_c$

---

Considering that the weighting factor is convex, the stochastic gradient descent procedure must converge to global optimum. For new data points (as well as the unlabeled points in the given dataset), predictions may be made using $y=w^T x$, where 'x' is the rank vector for a user. If y≤0, then prediction is 0 (not influential), else it is 1 (influential).

Also, the weights can be used to combine the scores and output a single score as $w^T x$, note that here the intercept $w_0$ is left out.

According to an embodiment, the weighting factor may be used to label the unlabeled users in the group. Further, the weighting factor may be multiplied to the scores of the users in the group in order to generate a new output or a single score for each user in the group and thereon, influential users are selected from the users in the group by a criterion set by the network service provider. The criterion may be based on the maximum usage of network, preference of service such as bill payment, gaming services etc, internet usage, maximum SMS usage, etc. For example, if the new score of the user is greater than 1 than the user may be influential and if the new score of the user is less than 1, then the user may not be influential.

According to an embodiment of the invention, the ASSLRA method may predict whether a user among the group is influential or not based on the users' usage and position in the Changing Data Record (CDR) list.

According to yet another embodiment, the method further comprises providing a feedback at step 122 to the active learning process for improving the selection of labeled users. The feedback may be provided to improve the selection of random number of users, such that the selected users are correctly labeled or to improve the identification of the influential users among the group of users.

The feedback loop may be provided by any of the following ways:

1) While sampling a new set of users to be labeled next time, the ones that are dissimilar to the ones picked earlier may be selected (by retaining that info).

2) By capturing the correctness of the predictions over time, the ranking model may be improved. For example, the ranking model may be based on the amount of the time the user has spent with the network service provider and the number of closed calling members the user has gained over time (who have moved from other network service provider to this network service provider newly). This can be used as a feedback (additional labeled instance) to update the parameters of the ASSLRA method, which are weights for combining different measures in this case. It also provides an opportunity to plug in any other easily computable extrinsic behavior, and tune the ASSLRA method. For instance, if friends (people whom he/she calls) of a user choose a particular plan as this user over time, then the information diffusion value of the user goes up.

3) The sampling algorithm may pick those instances that were labeled wrongly with high confidence in sampling phase i.e., when the combined score is high and the user turns out to be non-influential.

Figure 4:
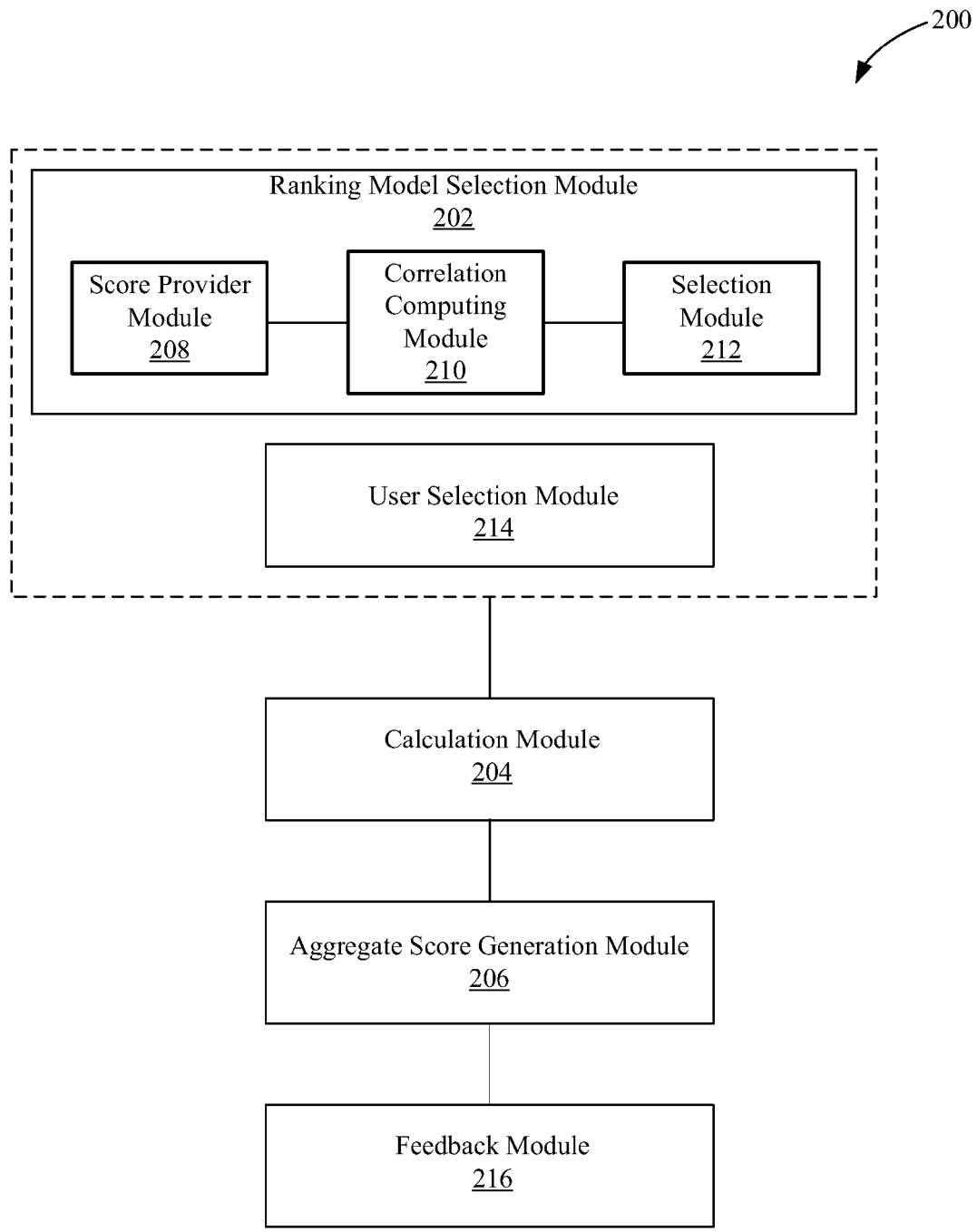
FIG. 4 illustrates a high-level block diagram of an influential users identifier for identifying influential users among a group of users associated with a communication network in accordance with an embodiment of the invention.

FIG. 4 illustrates a block diagram of an identifier 200 for identifying influential users among a group of users associated with a communication network according to an embodiment of the invention. The disclosed identifiers may be implemented in a computer system or a group of computer system for identifying influential. The identifier 200 may comprise of a ranking model selection module 202, a calculation module 204 and an aggregate score generation module 206.

The ranking model selection module 202 may be configured for selecting two or more ranking models. According to an embodiment of the invention, the ranking models may be based on, such as but not limited to, an eigen vector centrality, a betweenness centrality, a closeness centrality or a degree centrality. The ranking model selection module 202 is configured to provide scores to the users in the group using the ranking models based on a usage data of the users. According to an embodiment, the scores provided to the users in the group may be in the form of numeric scores or grades or percentages, etc. According to an embodiment of the invention, the ranking selection module 202 may be configured to generate ranks for users in the group.

According to an embodiment, the ranking model selection module 202 may be configured to select the ranking models based on a past experience. According to yet another embodiment, the ranking model selection module 202 may have a module 208 configured for providing scores to the users in the group using each one of the ranking models, a correlation computing module 210 configured for computing correlation between the scores provided to the users by each ranking models and a selection module 212 configured for selecting two or more ranking models, based on the correlation, such that the ranking models, which provide substantially different scores to the users, are selected.

The score generated from the various ranking models may be provided to the calculation module 204. The calculation module 204 may be configured for calculating a weighing factor for each of the selected ranking models. According to an optional embodiment, the identifier 200 may have a standardization module (not shown). The standardization module may be configured standardized the scores of the users provided by the various ranking models in a specific format such that all the scores of the users in the group represents a common unit of measure.

For example, each ranking model may provide a score to each user in the group, the score may be in the form of numeric scores or grades or percentages. If the scores are in different format, then it may not be possible to use the output of the various ranking models to identify influential users in the group. The scores may be standardized to produce a common output such that the scores provided by various ranking models to the users in the group may have a similar unit of measure such as, but not limited to, all the scores of the users in the group may be standardized in numeric score or grades.

According to an embodiment, the standardization may not be required, if the output of the various ranking models is in same unit of measure, such as but not limited to, numeric score, grades or ranks.

The calculation module 204 is configured for calculating a weighing factor for each of the selected ranking models. According to an embodiment, before calculating weighing factor, the users may be divided as labeled user and unlabeled users by a user selection module 214 as illustrated at step 122 in FIG. 1. According to an embodiment of the invention, the user selection module 214 may employ an active learning (AL) process for divided the users as labeled user and unlabeled users.

According to an embodiment, calculation module 204 may be configured to calculate the weighing factor (C) using following equation:

$$C = \frac{1}{2m}\left(\alpha * \sum_{j \in Labeled} \|f_j(x) - y\|^2 + \beta * \sum_{j \in L \cup U} \sum_{i \in R} \|f_{ij}(x) - \mu_j\|^2\right)$$

wherein 'm' represents total number of users, 'R' represents ranking models, L denotes labeled users, U denotes unlabeled users α represents relative weightage for data of labeled users, β represents relative weightage for consensus between ranking models on the combined data of labeled as well as unlabeled users and wherein for a user 'j' among the 'm' users, '$\mu_j$' is a mean of the scores provided by each selected model to the '$j^{th}$' user. In case where both are given equal weightage, these terms may be ignored.

The aggregate score generation module 206 is configured for generating an aggregate score for each users using the weighing factor and the score provided by each one of the selected model such that the influential users may be identified based on the aggregate score. According to an embodiment, the aggregate score generation module 206 may be further configured to multiply the weighing factor of each model with the score provided by said model to a particular user so as to obtain a modified score; and add the modified scores obtained from two or more selected ranking models to obtain the aggregate score for each user. The influential users may be identified based on the aggregate score among the group of users. According to an embodiment, the influential users may be identified, among the group of users, by comparing the aggregate score with a predefined score. According to an embodiment, the predetermined score may be '0' or '1'.

According to yet another embodiment, the identifier 200 may further have a feedback module 216 for providing feedback to user selection module 214 so as to improve the selection of labeled users.

According to yet another embodiment of the invention, the modules as illustrated in FIG. 4 are logical functions, which need to be performed in a serial order i.e. the module 202 should be executed first then 204 and so on, however each module execution may be parallelized i.e. when module 204 is being executed, the input (which is scores from module 202) may be split into multiple units and may be executed in a cluster of computers comprised in the computer system and then combined together to arrive at the final result of the respective module. Likewise all the modules illustrated in FIG. 4 may be executed parallely one by one in a chained fashion (input of module X is output of module X−1, output of module X becomes input for module X+1 and so on).

For each step, one or more computers may be used to execute the step parallely. The time required to complete the process may depend on the total number of computers used. If more computers are implemented, less time will be required to execute each module. However, all the modules will be executed in a lock step manner (one by one). Each module may be implemented as one Map-Reduce job in a Hadoop and chained the jobs together in the above fashion.

According to another embodiment of the invention, a computer program product is disclosed. The computer program product store program instructions, executable by a computer system, for identifying influential users among a group of users associated with a communication network, wherein the program instructions comprises code means which when run on the computer system, causes the computer system to select two or more ranking models and providing scores to the users in the group using said ranking models based on usage data of the users. The code means then causes the computer system to calculate a weighing factor for each of the selected ranking models and generate an aggregate score for each users using the weighing factor and the score provided by each one of the selected model. The code means further causes the computer system to identify the influential users based on the aggregate score among the group of users.

Figure 5:
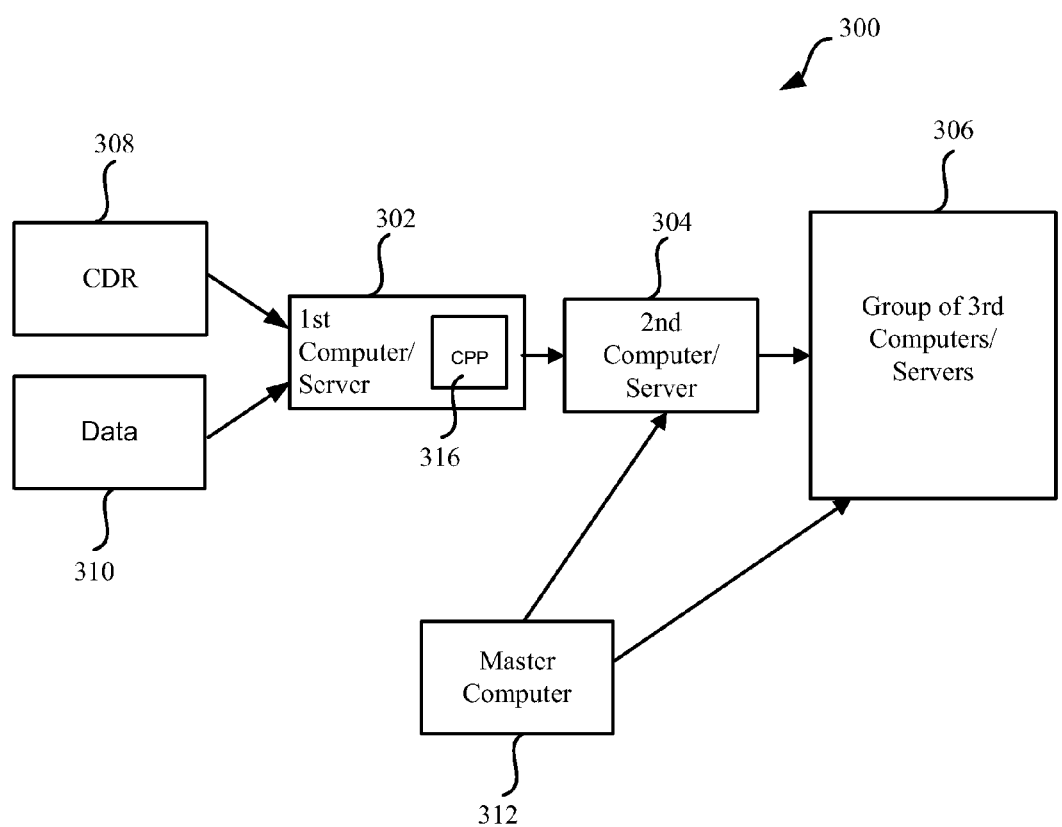
FIG. 5 illustrates a high-level block diagram showing another embodiment of the computer system in the form of a distributed computer system in accordance with an embodiment of the invention.

FIG. 5 illustrates the identifier 200 implemented in a distributed computer system 300 (distributed data processing system). Hadoop software framework may be utilized in this embodiment.

Data, e.g. CDR 308 and/or other types of data such as e-mail traffic, facebook data etc., here indicated at reference numeral 310, are provided to a first computer/server 302, which may be owned by a telecommunication network operator. The data may be provided from the first computer/server 302 to a second computer/server 304. The second computer 304 belongs to the distributed computer system 300 and distributes the data among a group of third computers/servers 306 which also belong to the distributed computer system 300. The second computer 304 is here illustrated as a single computer, but it may be noted that the second computer 304 could in fact be a set of computers that distribute the data among the group of third computers 306. The distribution is thus scalable and more easily adapted to large amount of data in that the third computers 306 can work in parallel. According to an embodiment, one way of implementing the distribution is by using the log collection framework called Flume. The first computer 302 may be flume agent and each of the servers in the second computers 304 may be flume collector. The second computer 304 may collect the data from the first computer 302 and push parallely towards the third computer 306. The third computer 306 may utilize Hadoop map/reduce with a master computer 312 as both hadoop master and flume master (jobtracker, name node and flume master). The master computer 312 may then belong to the distributed computer system 300 as well and in such an embodiment, the master computer 312 uses the third computers 306 as hadoop slaves (task trackers and data nodes). The number of parallel third computers 306 may be any number ranging from two computers to several thousands and using Hadoop map/reduce.

The embodiments of the method according to one embodiment may be implemented using a single computer 302, and the distributed computer system 300 then comprises the first computer 302, which then comprises all the modules described in conjunction with FIG. 4. However, typically very large amount of data is to be processed and the distributed computer system 300 then comprises the second computer 304, which is arranged to receive data from the first computer 302. The distributed computer system 300 also then comprises the group of third computers 306 connected to the second computer 304, wherein the second computer 304 may be arranged to delegate a task for execution by the group of third computers 306.

The modules described in relation to FIG. 4 may be implemented as computer program product (CPP) 316. The computer program product 316 stores program instructions executable by a distributed computer system 300 to perform the above-described functions and methods. For example, the computer program product 316 may be a flash memory, a RAM (Random-access memory), ROM (Read-Only memory) or an EEPROM (Electrically Erasable Programmable ROM), and the computer program modules described above could in alternative embodiments be distributed on different computer program products in the form of memories within the computer system 300. The computer program product 316 may be an optical disc, such as a CD (compact disc) or a DVD (digital versatile disc) or a Blu-Ray disc.

The program instructions of the computer program product comprises of code means which when run on the distributed computer system 300, causes the distrusted computer system 300 to perform at least one of the embodiments of the method described above.

Throughout the description the terms "influence" and "influential user" are used. An "influential user" may be seen as a user that in some regard stands out against other users, or stated differently, an influential user may be seen as a user that in some regard (for some reason) is important to e.g. a telecommunications network service provider. That is, the network service provider needs to, or finds it important to identify the user for a particular reason, one reason for example being to identify a user that would be best suited to spread information. The person having the highest "influence" would be the user determined to be best suited to spread information, the person next best suited to spread information would be the one having the next highest influence and so on. Another reason could be to identify non-person nodes. Still another reason could be to identify potential buyers of a certain service. Still another reason could be to identify users (persons) that the network service provider has a high desire to keep as customers.

More tangible, for each user of a communication system certain parameters may be used to define the user. Returning to the example above, one such parameter may relate to the ability of a user to spread information, "information spreading parameter". The network service provider may, for each user, determine a value of this parameter, and users having a value lying e.g. among the top 10% of all users may be determined to be influential. All the users having parameter values within the top 10% of all users may in turn be ranked in accordance with their influence.

The method and system, as disclosed above, handles scenarios where amount of labeled users or data points may be very low. The method and identifier may naturally work well in "cold-start" conditions where a given domain is not given much history information to build an ASSLRA model. For example, a CDR data of an network service provider for a fixed range of time (say 1 month) may considered for deriving the influential users and finding out whether a given user is influential or not with no other extrinsic information may be difficult and cumbersome.

The computer system may be parallelizable, and may be tested on Hadoop. The computer system offers same quality as the single machine version, with a significant reduction in time needed to run the computer system such that large data like in the case of the telecommunication domain may be handled with ease.

The method and identifier may incorporate feedback received in the past. That may enable selecting most informative samples to be labeled which are distinct from earlier samples that were labeled in past, and those are labeled confidently correctly by the computer system. This feature allows continuous/adaptive learning, which may necessary for dynamic environment.

The method and identifier utilizes extrinsic feedback, for example, to find the information diffusion behavior of a user over time, this behavior may be used as a feedback to correct the active learning process. This can be used as a feedback to update the parameters of the ASSLRA model. The feedbacks also provide an opportunity to plug in any other easily computable extrinsic behavior, and tune the ASSLRA model.

What is claimed is:

1. A method for identifying influential users among a group of users associated with a communication network, the method comprising:
    selecting two or more ranking models and providing scores to the users in the group using said ranking models based on usage data of the users;
    calculating a weighing factor for each of the selected ranking models;
    generating an aggregate score for each user using the weighing factor and the score provided by each one of the selected ranking models; and
    identifying the influential users based on the aggregate score among the group of users by comparing the aggregate score with a predefined score.

2. The method according to claim 1, wherein selecting two or more ranking models comprises:
    providing scores to the users in the group using each one of the ranking models;
    computing correlation between the scores provided to the users by the ranking models; and
    selecting two or more ranking models based on the correlation, such that the ranking models which provide different scores to the users are selected.

3. The method according to claim 1, wherein generating the aggregate score comprises:
    multiplying the weighing factor of each model with the score provided by said model to a particular user so as to obtain a modified score; and
    adding the modified scores obtained from two or more selected ranking models to obtain the aggregate score for each user.

4. The method according to claim 1, further comprising labeling a number of users among the group of users using an active learning process thereby dividing the group of users into labeled users and unlabeled users.

5. The method according to claim 4, wherein the weighing factor (C) is calculated using the following equation:

$$C = \frac{1}{2m}\left(\alpha * \sum_{j \in Labeled} \|f_j(x) - y\|^2 + \beta * \sum_{j \in L \cup U} \sum_{i \in R} \|f_{ij}(x) - \mu_j\|^2\right)$$

wherein 'm' represents a total number of users, 'R' represents ranking models, L denotes labeled users, U denotes unlabeled users, $\alpha$ represents relative weightage for data of labeled users, $\beta$ represents relative weightage for consensus between ranking models on the combined data of labeled as well as unlabeled users and wherein for a user 'j' among the 'm' users, '$\mu_j$' is a mean of the scores provided by each selected model to the '$j^{th}$' user.

6. The method according to claim 4, further comprising providing a feedback to the active learning process for improving the selection of labeled users.

7. The method according to claim 4, wherein the active learning process uses an uncertainty density sampling technique for selecting the number of users from the group of users.

8. The method according to claim 4, wherein calculating the weighing factor includes using a stochastic gradient descent technique.

9. The method according to claim 4, wherein calculating the weighing factor includes using a Parallel Stochastic Gradient descent technique.

10. An influential users identifier for identifying influential users among a group of users associated with a communication network, wherein the identifier comprises:
    a ranking model selection module configured to select two or more ranking models and provide scores to the users in the group using said ranking models based on usage data of the users;
    a calculation module configured to calculate a weighing factor for each of the selected ranking models; and
    an aggregate score generation module configured to identify the influential users by:
        generating an aggregate score for each user using the weighing factor and the score provided by each one of the selected ranking models; and
        comparing the aggregate score with a predefined score.

11. The identifier according to claim 10, wherein the ranking model selection module comprises:
    a module configured to provide scores to the users in the group using each one of the ranking models;

a correlation computing module configured to compute correlation between the scores provided to the users by the ranking models; and a selection module configured to select two or more ranking models based on the correlation, such that the ranking models which provide different scores to the users are selected.

12. The identifier according to claim 10, wherein the aggregate score generation module is configured to:

multiply the weighing factor of each model with the score provided by said model to a particular user so as to obtain a modified score; and add the modified scores obtained from two or more selected ranking models to obtain the aggregate score for each user.

13. The identifier according to claim 10, further comprising an user selection module configured to label a number of users among the group of users using an active learning process thereby dividing the group of users into labeled users and unlabeled users.

14. The identifier according to claim 13, wherein the calculation module is configured to calculate the weighing factor (C) using following equation:

$$C = \frac{1}{2m}\left(\alpha * \sum_{j \in Labeled} \|f_j(x) - y\|^2 + \beta * \sum_{j \in L \cup U} \sum_{i \in R} \|f_{ij}(x) - \mu_j\|^2 \right)$$

wherein 'm' represents total number of users, 'R' represents ranking models, L denotes labeled users, U denotes unlabeled users, α represents relative weightage for data of labeled users, β represents relative weightage for consensus between ranking models on the combined data of labeled as well as unlabelled users and wherein for a user 'j' among the 'm' users, '$\mu_j$' is a mean of the scores provided by each selected model to the '$j^{th}$' user.

15. The identifier according to claim 13, further comprising a feedback module configured to provide a feedback to the active learning process for improving the selection of labeled users.

16. A computer program product stored on a non-transitory computer readable medium and comprising program instructions that, when executed by a computer system, cause the computer system to identify influential users among a group of users associated with a communication network, wherein the program instructions cause the computer system to:

select two or more ranking models and provide scores to the users in the group using said ranking models based on usage data of the users;

calculate a weighing factor for each of the selected ranking models;

generate an aggregate score for each user using the weighing factor and the score provided by each one of the selected models; and identify the influential users based on the aggregate score among the group of users la comparing the aggregate score with a predefined score.

* * * * *